United States Patent Office 3,284,381
Patented Nov. 8, 1966

3,284,381
AMYLOSE-BASED CORRUGATING ADHESIVES
Lawrence J. Hickey, Livingston, Robert H. Williams, New Brunswick, and Emil D. Mazzarella, Plainfield, N.J., assignors to National Starch and Chemical Corporation, New York, N.Y., a corporation of Delaware
No Drawing. Filed May 14, 1962, Ser. No. 195,029
7 Claims. (Cl. 260—17.3)

This invention relates to potential waterproof adhesive compositions based on amylose. More particularly, it relates to adhesives specifically intended for use in the manufacture of corrugated paperboard.

In the production of corrugated board, the procedure usually employed involves a continuous process wherein a strip of paperboard is first corrugated by means of heated fluted rolls, an adhesive is applied to the protruding tips on one side of this corrugated strip, a flat strip of another paperboard is then brought into contact with these tips, and, by the application of heat and pressure, a bond is formed. This latter step is then repeated on the other side of the corrugated strip so as to yield a hard sheet of paperboard comprising an inner corrugated layer sandwiched between two flat outer layers.

The adhesive composition most widely used in the above process comprises a suspension of raw, ungelatinized starch in an aqueous dispersion of cooked starch. The cooked starch dispersion, being rather viscous, serves as a carrier to keep the ungelatinized starch in suspension. At the point in the corrugating process where the flutes of the corrugated paperboard are to be adhered to the flat paperboard, sufficient heat is applied to gelatinize the ungelatinized starch component of the adhesive, resulting in a sudden rise in viscosity and formation of the adhesive bond.

Adhesives used in the corrugating procedure described above have suffered from several drawbacks. Such adhesives have, for example, often demonstrated poor viscosity stability. Under conditions of high alkalinity, the starch molecule tends to break down, resulting in an undesirable viscosity decrease. These adhesives also suffer viscosity decreases when they are subjected to mechanical agitation or to the shearing action of the pumps used in the recirculation system of the corrugating apparatus. Should this agitation or shearing action continue for prolonged periods, the vastly reduced viscosity of the adhesive may eventually render it ineffective. In addition, corrugating adhesives which have seemingly withstood the effects of agitation and shear have been known to undergo severe viscosity breakdowns when exposed to the action of the high speed glue line rollers which apply these adhesives to the corrugated stock. In some cases, the corrugating adhesive will even increase in viscosity due to an accelerated reaction between the waterproofing agents and the starch. Such generally poor and erratic viscosity characteristics have necessitated extreme care, on the part of the practitioner, in the preparation and handling of these two part starch adhesive compositions.

Several procedures have been devised to produce potential waterproof adhesive compositions for use in the manufacture of corrugated paperboard. In one such method, amylaceous material has been combined with urea-formaldehyde resins using aluminum sulfate as a catalyst to produce potential, water-resistant or waterproof bonds. These compositions must be prepared at a pH of less than 5 in order to enable the resin to function as the waterproofing agent. This low pH imparts poor flow properties to the adhesive composition, thus resulting in greatly reduced machine speeds, corrosion of the glue rolls, and prevention of the development of many desirable paste characteristics, such as tackiness, viscosity, rate of setting, and other properties. In another method, amylaceous material is cooked, under alkaline conditions, with resins which set or harden at a pH of above 7. Although bonds of corrugated board prepared from these adhesives are water resistant, on exposure to wet weather conditions, they tend nevertheless to delaminate and fail to pass Federal specifications for corrugated paperboard.

Other waterproofing corrugating adhesives, such as those employing resorcinol and formaldehyde with starch, siimlarly suffer from serious drawbacks. The cost of such adhesives is often prohibitive in nature because of the large amount of resorcinol that is required for these compositions. In addition, these adhesives have a very short pot life at the pH range most useful for maximum production speeds. Another shortcoming which is displayed in the manufacture of corrugated board by the potential waterproof adhesive compositions comprising starch, resorcinol, and formaldehyde is the slow rate of bond formation which results from the relatively low pH of such adhesive formulations. As is well known in the art, increased alkalinity of corrugating adhesives comprising ungelatinized starch lowers the gelatinization temperature of the starch. When this occurs in situ, the lower temperature permits higher machine speeds as the input of heat in conventional corrugating machines is standardized. When the pH of the above composition is increased, the pot life of the adhesive composition is made still shorter and there is always the danger, in case of pump stoppage, that the pipe lines will block and cause still further delays.

The use of resorcinol-formaldehyde starch adhesives is also accompanied by other disadvantages. Thus, as a result of the inclusion of formaldehyde in the adhesive composition, the manufacturing process is always burdened with offensive odors. Moreover, board bonded with these starch adhesives cannot be repulped by waste paper dealers. These adhesives possess the additional disadvantage of having a dark color, thereby limiting the applications in which they may be utilized.

It is an object of this invention to produce potential waterproof adhesive compositions characterized by their prolonged pot life and exceptional stability under highly alkaline conditions as well as by their ability, when combined with web material such as corrugated board, of gelatinizing in situ to form a waterproof bond. Another object of this invention is to increase the efficiency and economy of the corrugating process by the use therein of the novel adhesives of this invention. Other objects and the advantages of this invention will be apparent from the discussion that follows hereinafter.

We have discovered that the use of stabilized amylose solutions as carriers for raw, ungelatinized starch solids provide potential waterproof adhesive compositions possessing properties which make such compositions remarkably well suited for corrugating paperboard. The use of amylose in the carrier portion of the corrugating adhesive allows for the formulation of adhesive compositions which exhibit several desirable characteristics. Thus, corrugating adhesives employing stabilized amylose solutions as the carrier portions thereof show exceptional viscosity stability and pot life, even under conditions of high alkalinity. In addition, such adhesives possess excellent tack, flow, and machining properties. The bonds formed by these adhesives are exceedingly waterproof and pass Federal specifications for fiberboard boxes. Moreover, the water resistance of the boards prepared by using these adhesives is attained within a short time after they have left the machine, thereby facilitating their further processing. In addition, the use of these adhesive formulations makes possible high production speeds because of the higher alkalinity employed, avoids the offensive or toxic odors that often arise from the use of resorcinol and formaldehyde with starch, and, in general, effectively increases the overall efficiency and economy of the corrugating process.

It should be noted that, for the purposes of this invention, the term "amylose" refers to the amylose resulting from the separation of the amylose and amylopectin components of whole starch, as well as to whole starches containing at least 55% by weight of amylose. It should be further noted that, when reference is made to amylose dispersions or solutions, such reference comprehends, in effect, hydrated colloidal dispersions. Although amylose cannot form true ionic solutions, such hydrated coloidal dispersions of amylose are commonly referred to as dispersions or solutions.

The advantages to be realized from the use of dispersed amylose in the carrier portion of corrugating adhesives could not heretofore be realized as a result of difficulties encountered in forming aqueous dispersions of amylose. These difficulties result from the basic configuration of the amylose molecule which allows amylose molecules to align themselves, forming many hydrogen bonds between the aligned chains, and thus becoming insoluble in water. This difficulty is encountered whether the amylose is the pure product resulting from the fractionation of starch or whether it is part of a whole starch containing a high amylose ratio. Amylose in the dispersed form also exhibits a high degree of instability, and, on standing for short periods of time, the amylose present in solutions or dispersions of amylose will ultimately precipitate or retrograde. Moreover, such precipitation is again evident when amylose solutions are mixed with raw starch slurries. It is apparent, therefore, that the above described inherent advantages of using amylose in corrugating adhesives can be realized only by providing stable amylose solutions.

In accordance with this invention, we prepare corrugating adhesives whose carriers comprise slurries or dispersions of amylose which have been stabilized by being mixed with paraformaldehyde and urea, or fully operable equivalents of these reagents, under conditions of alkaline pH.

As was mentioned hereinabove, paraformaldehyde or an operable equivalent thereof is used in the stabilizing system for dispersions of amylose. Fully operable equivalents of paraformaldehyde which may be used include aqueous solutions of formaldehyde stabilized with methanol, aqueous solutions of methanol-free formaldehyde, and commercially available non-polymeric aqueous urea-formaldehyde concentrates, these concentrates having a weight ratio of urea to formaldehyde of from 1:0.25 to 1:2.5. Urea or an operable equivalent thereof is also used in the stabilizing system for amylose dispersions. Fully operable equivalents of urea which may be used include monomethylol urea, succinamide, adipamide, and similar compounds.

Amylose dispersions mixed with such stabilizing systems are highly stable and can be maintained for extended periods of time without any appreciable settling or retrogradation of the amylose. To these novel carrier compositions there is then added raw, ungelatinized starch solids or an aqueous suspension thereof, and the resulting potential waterproof adhesive composition may then be used in the preparation of corrugated board by means of the earlier described in situ bonding process.

Essentially, there are two procedures whereby our potential waterproof adhesives may be formulated. In the preferred practice, the dispersed amylose carrier is diluted with water in order to obtain the desired viscosity level and then additional agents to improve water resistance are added to the diluted carrier. Raw starch in dry, granular form is then added to the carrier and the formulation is mixed until it is of a smooth consistency. In another method of formulating our adhesives, additional waterproofing agents are added to the carrier portion before it is diluted. The dry, granular starch is slurried in the water that is to be used to dilute the carrier, and this slurry is then added to dilute the carrier, the formulation thereafter being mixed until it is of a smooth consistency.

The preparation of our corrugating adhesives may be set forth in more detail as follows:

(a) *Preparation of carrier:*

(1) Prepare an aqueous slurry of amylose (additional optional solids, such as stabilizing salts, fillers, and the like, may be added at this point).

(2) Heat to a temperature ranging from 120° F. to 170° F.

(3) Add alkali in flake, granular, or pelletized form; alternatively, the alkali may be dissolved in water.

(4) Mix the solution for a period of time ranging from 5 to 30 minutes.

(5) Add all the urea and paraformaldehyde or operable equivalents thereof.

(6) Mix the solution for a period of time ranging from 5 to 60 minutes.

Additional details relating to the preparation of these stabilized amylose solutions are set forth in a copending patent application entitled, "Stabilization of Amylose," Serial Number 192,334, filed May 4, 1962, and assigned to the assignee of the subject application.

(b) *Preparation of adhesive composition:*

(1) Dilute the stabilized amylose carrier to the desired viscosity and reduce the temperature of the solution to approximately 120° F.

(2) Add various materials that improve water resistance (listed hereinafter).

(3) Add raw starch solids in dry, granular form and mix the resulting slurry until it is of a smooth consistency.

As was mentioned previously, various materials listed hereinafter for improving water resistance may be added to the carriers of our invention before the latter are diluted to the desired viscosity. Also, the dry, granular starch solids may be slurried in the water that is to be used to dilute the carrier, and this slurry is then added in order to dilute the carrier, the formulation thereafter being mixed until it is of a smooth consistency.

In the preparation of our amylose carriers as outlined above, several variations may be utilized. The alkali, for example, may be added to the amylose slurry before or after the latter has been heated. Also, the amylose may be slurried in water before or after the water has been heated. Finally, the stabilizing agents may be added individually or in combination and in any desired sequence, either before or after the addition of alkali and/or amylose.

As was previously mentioned, high amylose starches, i.e., starches containing at least 55% by weight of amylose may be utilized in the preparation of the carrier portion of our corrugating adhesives. These high amylose starches may be used to replace all or a part of the pure amylose in the carrier portion of our adhesive compositions. The amylose content of the high amylose starches will determine the amount of pure amylose which they can replace. Thus, for example, in order to maintain an overall amylose content of about 80% by weight, up to 60% of the pure amylose can be replaced with a high amylose starch having a 75% by weight amylose content, and up to 35% of the pure amylose can be replaced with a high amylose starch having an amylose content of 55% by weight. In employing these high amylose starches, it should be noted that the amount of pure amylose that can be replaced by the high amylose starches will be regulated by the degree of water resistance which is desired in the resulting adhesive formulation.

The amylose present in the carrier portion of our adhesives may also be extended by employing any type of unmodified or modified starch (other than the high amylose starches previously mentioned) in amounts ranging from about 0.5 to about 15% as based on the weight of amylose. The limiting factors in using these ordinary starches are the increases in viscosity and the reductions in water resistance which are obtained as increasing quantities of such starches are introduced into the carrier portions of our adhesive compositions. Any type of starch may be used as a partial replacement for amylose in the carrier, provided that no more than about 5% by weight of the amylose is so replaced. The raw or modified starch which is used in our corrugating adhesive may similarly be derived from any desired source, such as corn, sago, wheat, rice, sweet potato, sorghum, waxy sorghum, waxy maize, potato or tapioca.

The components of our adhesive formulations may vary within the concentration ranges set forth in the table reproduced below. Both broad and preferred ranges of these components are set forth in the following table:

|   | Components | Parts by weight based on 100 parts of dispersed amylose | |
|---|---|---|---|
|   |   | Broad range | Narrow range |
| A | Carrier: | | |
|   | Water | 600–1,100 | 720–820 |
|   | Urea | 5–100 | 10–30 |
|   | Paraformaldehyde | 10–100 | 18–25 |
|   | Alkali | 10–30 | 15–20 |
|   | Clay (or other inert fillers) | 1–50 | 5–20 |
|   | Stabilizing salts | 1–60 | 3–18 |
| B | Remainder of Formulation: | | |
|   | Water | 600–1,500 | 800–1,000 |
|   | Resins | 1–65 | 10–40 |
|   | Raw Starch | 300–700 | 450–550 |

Adhesive formulations employing any of the compositions falling within the ranges set forth in the above table have been found to provide effective waterproof corrugating adhesives.

Below are listed the various clays, fillers, salts, and resins (and the amounts in which they may be used) which may be incorporated in our adhesive compositions. It is to be understood that this list is not intended to be exhaustive, but is merely representative of various additives that are more commonly used in formulating corrugating adhesives. It should also be mentioned that an effective corrugating adhesive can be formulated without the addition of any of these additives.

|   | Additive | Concentration (weight percent based on gelatinized amylose solids) |
|---|---|---|
| a | To modify adhesive properties: | |
|   | Boron and its salts | 0.1–6 |
|   | Alkali metal chlorides | 1–60 |
|   | Alkali metal acetates | 1–60 |
|   | Alkali metal sulfates | 1–60 |
|   | Alkali metal phosphates | 1–60 |
|   | Ammonium salts | 1–15 |
|   | Sodium hexametaphosphate | 0.1–5 |
|   | Clay: | |
|   | (aluminum) | 1–50 |
|   | (silicate) | 1–50 |
|   | (pigments) | 1.50 |
|   | (colloidal) | 1.50 |
|   | Polyvinyl alcohol | 1–10 |
|   | Sodium alginate | 1–6 |
|   | Diatomaceous earth | 1–40 |
|   | Alkyl aryl sodium sulfonates | 0.1–6 |
|   | Silicone defoamers | 0.1–3 |
| b | To modify water resistance: | |
|   | Urea-formaldehyde resins | 1–65 |
|   | Ketone-formaldehyde resins | 1–65 |
|   | Acrolein condensates | 1–65 |
|   | beta-Resorcylic acid | 1–15 |

It can be seen, therefore, that the corrugating adhesives produced by the process of this invention possess several advantageous features over previously used corrugating adhesives. Our adhesives, in addition to being highly water resistant, have a prolonged pot life, exceptional stability under highly alkaline conditions, and compatibility with commonly used alkaline corrugating adhesives. These adhesives are considerably more resistant to any viscosity decrease resulting from the violent agitation or shear encountered during the pumping that these adhesives undergo during the corrugating process. The adhesives are also resistant to viscosity breakdowns resulting from contact with the high speed glue line rollers of the corrugating apparatus. The corrugating adhesives of our invention possess the additional feature of attaining water resistance in the board within a short period after the board has been removed from the machine. The use of stabilized amylose as the carrier for our adhesive compositions also enables a colorless adhesive bond to be formed. The corrugating procedure is further enhanced by the use of our adhesives by the realization of high production speeds, freedom from offensive odors, and a simple, economical method of operation. Furthermore, corrugated board bonded with our adhesives can be repulped by standard methods and thus can be reworked by waste paper dealers. Of course, the waterproof bond achieved by our adhesive passes Federal specifications for fiberboard boxes.

In the following examples, which further illustrate the embodiment of our invention, all parts given are by weight, unless otherwise indicated.

In the examples that follow, the various tests described immediately hereinafter were employed:

TESTS FOR QUALITY OF WATERPROOF BOND

The test methods used in the examples follow those outlined in the Federal Specifications for Fiberboard Boxes PPP–B–636b, Sections 4.4.1.2.1; 4.4.1.2.2; 4.4.1.2.3; and 4.4.3

Tests were made by combining three different grades of linerboard: (a) 42# Domestic Linerboard, made from virgin graft pulp on a Fourdrinier machine, and weighing 42 lbs per 1000 sq. ft.; (b) 90# Domestic Linerboard, made from virgin graft pulp on a cylinder machine, and weighing 90 lbs. per 1000 sq. ft.; (c) 90# Weathertex Linerboard, made from virgin graft pulp on a cylinder machine, containing a small amount of a thermosetting resin to obtain resistance to atmospheric conditions, and weighing 90 lbs. per 1000 sq. ft.

In the following examples, tests were made on each of the above linerboards and the results averaged. In order to avoid repetition, the procedure for combining the linerboards to form the waterproof bonds will be described at this point.

FORMING THE WATERPROOF BOND

The adhesive composition is coated on one side of each of two boards of the three different types. The wet surfaces are then combined under pressure, for about 20 seconds at 350° F. The thus combined liners are generally termed "paste-ups."

CONDITIONING THE PASTE-UPS

The paste-ups are first cured in an atmosphere having 60±12% relative humidity of about 75±5° F. for at least 24 hours.

The paste-ups are then immersed for 24 hours in fresh tap water maintained at a temperature of 75±5° F. The pH of the water is between 5.5 and 8.0, and the water is renewed for each test. After 24 hours, the paste-ups are removed from the water, and the surface water is removed by blotting.

TESTING PROCEDURES

As was noted above, each of the "combined" linerboards was tested after the 24 hour soaking. The testing procedures follow:

(a) *Ply separation.*—This was determined by flexing the edges by pressure from the thumb, the pressure being sufficient only to overcome the surface tension of the water. Separation of the components of the corrugated material should not extend more than ¼ inch from the edge of the test specimen.

(b) *Fiber tear.*—In the above test, shearing of the fiberboard or separation of the fibers was not considered to be ply separation. However, after physical separation, the samples were then examined for degree of fiber tear relative to the area of the adhesive bond. This result was expressed as percent fiber tear.

(c) *Penetration tests for holdout properties.*—These tests were made at 100° F. 75 ml. of the potential waterproof corrugating adhesive were added to a 150 ml. beaker. On the top of the beaker there was secured a sheet of Whatman filter paper, grade No. 5. A few crystals of potassium permanganate were then brushed into the top of the filter paper and the excess was removed. The beaker containing the adhesive composition was then turned upside down and back to the original position in one complete, instantaneous motion. This was done to coat the inside of the filter paper with adhesive. At this point, the time was noted and recorded. When the top of the filter paper turned a distinct shade of red, the time was again noted and recorded. The elapsed time, in seconds, was a relative measure of the penetrating power of the adhesive composition. This is usually referred to as the "holdout" property.

(d) *Viscosity at 100° F.*—Viscosities were determined by means of the conventional Stein-Hall cup which method consists essentially of measuring the time, in seconds, required for 100 ml. of the adhesive composition to pass through an orifice having a diameter of 3/32 inch.

*Example I*

This example illustrates the compatibility of our stabilized amylose based corrugating adhesive with commonly used alkaline corrugating adhesives.

In this example, and in each of the examples which follow, we utilized, with minor variations, the procedure that is described hereinafter. In this basic procedure, an aqueous slurry of amylose was heated at temperatures ranging from 120° to 170° F., sodium hydroxide was added to the solution, and thereafter the solution was mixed for a period of time ranging from 5 to 30 minutes. The stabilizing system of urea and paraformaldehyde, or operable equivalents thereof, was then added to the carrier solution and the solution thereupon mixed for a period ranging from 5 to 60 minutes. The carrier solution was then diluted to the desired viscosity and the temperature of the solution was lowered to about 120° F. At this point, various additives, such as those for improving water resistance, were included, if so desired. The raw starch solids were then added to the carrier solution and the resulting slurry was mixed until it was of a smooth consistency.

The above procedure was employed to formulate an adhesive composition, containing the quantities of the adhesive constituents as represented in the following table:

| Water (carrier) | Amylose | Sodium Hydroxide | Paraformaldehyde | Urea | Water (in raw starch portion) | Raw Corn Starch |
|---|---|---|---|---|---|---|
| 230 | 28 | 4.5 | 6.2 | 8.0 | 288 | 136 |

This adhesive composition was then treated as outlined above. The following results were obtained:

Ply separation—satisfactory
Fiber tear—90%
Penetration time—19.9 seconds
Initial viscosity at 100° F.—30 seconds Fiberboard produced by using this adhesive formulation was waterproof and passed Federal specifications for fiberboard boxes.

The above described adhesive formulation was mixed with a commonly utilized alkaline starch adhesive. The resulting mixture was stable, thus indicating complete compatibility between our adhesive and alkaline corrugating adhesives.

*Example II*

This example illustrates the preparation of corrugating adhesive compositions of our invention, wherein various additives were added in order to modify the properties of the resulting compositions.

(a) In formulating the adhesive compositions of this example, the procedure as was set forth in Example I was followed with the exception that modifying agents were slurried together with the amylose and the initial quantity of water.

The table reproduced below sets forth formulations incorporating these agents and also sets forth the results obtained when these formulations were tested in the manner described previously.

TABLE I

| Formulation Number | Water (carrier) | Amylose | Additive | Amount of Additive | Alkali | Paraformaldehyde | Urea | Water (raw starch portions) | Raw Corn Starch | Viscosity (seconds) | Holdout (seconds) |
|---|---|---|---|---|---|---|---|---|---|---|---|
| 1 | 230 | 30 | Sodium chloride | 3 | 4.5 | 6.2 | 8.0 | 288 | 140 | 26.2 | 10.2 |
| 2 | 230 | 30 | Sodium acetate | 3 | 4.5 | 6.2 | 8.0 | 288 | 140 | 25.0 | 16.8 |
| 3 | 230 | 30 | Sodium sulfate | 3 | 4.5 | 6.2 | 8.0 | 288 | 140 | 23.7 | 12.6 |
| 4 | 230 | 30 | Potassium chloride | 3 | 4.5 | 6.2 | 8.0 | 288 | 140 | 25.4 | 11.6 |
| 5 | 230 | 30 | Ammonium chloride | 2 | 4.5 | 6.2 | 8.0 | 288 | 140 | 17.0 | 3.3 |
| 6 | 230 | 30 | Polyvinyl alcohol | 1 | 4.5 | 6.2 | 8.0 | 288 | 140 | 26.4 | 7.9 |
| 7 | 230 | 30 | Clay | 15 | 4.5 | 6.2 | 8.0 | 288 | 140 | 29 | 27.5 |
| 8 | 230 | 30 | Irish Moss | 1 | 4.5 | 6.2 | 8.0 | 288 | 140 | 37.4 | 15.1 |
| 9 | 230 | 30 | Sodium alginate | 1 | 4.5 | 6.2 | 8.0 | 288 | 140 | 41.0 | 19.6 |
| 10 | 230 | 30 | Diatomaceous earth | 6 | 4.5 | 6.2 | 8.0 | 288 | 140 | 34.6 | 15.4 |
| 11 | 230 | 30 | Sodium phosphate | 3 | 4.5 | 6.2 | 8.0 | 288 | 140 | 24.2 | 14.1 |

Fiberboard produced by using each of the above listed formulations was waterproof and passed Federal specifications for fiberboard boxes.

(b) In formulating the adhesive compositions of this example, the procedure as set forth in Example I was followed, wherein modifying agents were added after the carrier solution had been prepared.

The table reproduced below sets forth formulations incorporating these agents and also sets forth the results obtained when these formulations were tested in the manner described previously.

TABLE II

| Formulation Number | Water (carrier) | Amylose | Alkali | Paraformaldehyde | Urea | Water (raw starch portions) | Raw Corn Starch | Additive | Amt. of Additive | Viscosity (seconds) | Holdout (seconds) |
|---|---|---|---|---|---|---|---|---|---|---|---|
| 1 | 230 | 30 | 4.5 | 6.2 | 8.0 | 288 | 140 | Borax | .88 | 57.4 | 19.6 |
| 2 | 230 | 30 | 4.5 | 6.2 | 8.0 | 288 | 140 | Sodium Hexametaphosphate | 1.2 | 23.6 | 11.6 |
| 3 | 230 | 30 | 4.5 | 6.2 | 8.0 | 288 | 140 | Urea-formaldehyde resin | 10 | 32.9 | 24.8 |
| 4 | 230 | 30 | 4.5 | 6.2 | 8.0 | 288 | 140 | Ketone-formaldehyde resin | 10 | 31.9 | 22 |
| 5 | 230 | 30 | 4.5 | 6.2 | 8.0 | 288 | 140 | Beta resorcylic acid | 2 | 24.6 | 7.6 |
| 6 | 230 | 30 | 4.5 | 6.2 | 8.0 | 288 | 140 | Acrolein condensate | 10 | 28.3 | 17.7 |
| 7 | 230 | 30 | 4.5 | 6.2 | 8.0 | 288 | 140 | Alkyl aryl sodium sulfonate | 1 | 25.3 | 15 |
| 8 | 230 | 30 | 4.5 | 6.2 | 8.0 | 288 | 140 | Silicone defoamer | 0.5 | 27.1 | 15.5 |

Fiberboard produced by using each of the above listed formulations was waterproof and passed Federal specifications for fiberboard boxes.

*Example III*

This example illustrates the use of various starches to extend the amylose used as the carrier in the corrugating adhesives of our invention.

In formulating the adhesive compositions of this example, the procedure as set forth in Example I was followed with the exception that various starches were used to extend the amylose of the carrier. The formulations are set forth in the table appearing below:

| Formulation Number | Water (carrier) | Amylose | Starch Extender | Parts of Extender | Sodium Hydroxide | Paraform | Urea | Water (raw starch portion) | Raw starch |
|---|---|---|---|---|---|---|---|---|---|
| 1 | 230 | 30 | Corn starch | 3 | 4.5 | 6.2 | 8.0 | 288 | 140 |
| 2 | 230 | 30 | Hydrolyzed Waxy Maize | 3 | 4.5 | 6.2 | 8.0 | 288 | 140 |
| 3 | 230 | 30 | Cold water sol. corn starch | 3 | 4.5 | 6.2 | 8.0 | 288 | 140 |
| 4 | 230 | 30 | Potato starch | 3 | 4.5 | 6.2 | 8.0 | 288 | 140 |

These adhesive compositions were then tested as described previously. The following results were obtained:

| Formulation Number | Ply Separation | Fiber Tear, percent | Penetration Time (sec.) | Initial Viscosity at 100° F. (sec.) |
|---|---|---|---|---|
| 1 | Satisfactory | 80 | 16.7 | 41.7 |
| 2 | do | 85 | 12.8 | 31.6 |
| 3 | do | 80 | 20.1 | 38.8 |
| 4 | do | 80 | 24.4 | 100 |

Fiberboard produced by using each of the above listed formulations were waterproof and passed Federal specifications for fiberboard boxes.

*Example IV*

This example illustrates the preparation of corrugating adhesive formulations by means of the process of our invention.

In formulating the adhesive compositions of this example, the procedure as set forth in Example I was followed. The various adhesive formulations are set forth in the table appearing below:

TABLE III(a)

| Formulation Number | Total Water | Amylose | Salt | Amt. of Salt | Urea | Paraformaldehyde | Urea-formaldehyde Condensate |
|---|---|---|---|---|---|---|---|
| 1 | 500 | 30 | Sodium chloride | 3 | 8.0 | 6.2 | |
| 2 | 500 | 30 | do | 5 | 8.0 | 6.2 | |
| 3 | 500 | 30 | do | 5 | | | 10.5 |
| 4 | 500 | 30 | do | 5 | 5.3 | | 10.5 |
| 5 | 500 | 34 | Sodium acetate | 3 | | | 10.5 |
| 6 | 500 | 39 | do | 4 | | | 10.5 |
| 7 | 500 | 30 | Sodium chloride | 5 | | | 10.5 |
| 8 | 500 | 30 | do | 5 | | | 10.5 |
| 9 | 500 | 30 | do | 5 | | | 10.5 |

| Formulation Number | Alkali | Clay | Amt. of Clay | Carrier Starch Type | Carrier Starch Amt. | Water Resistance Modifier | Raw Corn Starch |
|---|---|---|---|---|---|---|---|
| 1 | 4.5 | Aluminum silicate | 2.5 | Cornstarch | 1.5 | | 160 |
| 2 | 5.0 | Sodium bentonite | 2.1 | | | | 160 |
| 3 | 4.5 | do | 2.1 | | | | 160 |
| 4 | 4.5 | do | 2.1 | | | | 160 |
| 5 | 4.5 | | | | | | 160 |
| 6 | 4.5 | | | | | | 160 |
| 7 | 6.5 | Sodium bentonite | 2.1 | | | Ketone formaldehyde resin (10.5 pts.) | 160 |
| 8 | 6.5 | do | 2.1 | | | Acrolein condensate (10.5 parts) | 160 |
| 9 | 5.0 | Attapulgite clay | 2.1 | | | | 160 |

These adhesive compositions were then tested as described previously. The following results were obtained:

TABLE III(b)

| Formulation number | Viscosity (seconds) | Holdout (seconds) |
|---|---|---|
| 1 | 38 | 20.7 |
| 2 | 27.9 | 17.5 |
| 3 | 29 | 19.5 |
| 4 | 46 | 16.2 |
| 5 | 35 | 10.1 |
| 6 | 46.7 | 13.7 |
| 7 | 26.5 | 21.6 |
| 8 | 24.7 | 18.2 |
| 9 | 27.2 | 18.5 |

Fiberboard produced by using each of the above listed formulations was waterproof and passed Federal specifications for fiberboard boxes.

Example V

This example illustrates the use of high amylose content starches in the adhesive formulations of our invention.

TABLE IV

| Formulation number | Water (carrier) | Amylose | Corn Starch having 75% amylose | Corn Starch having 55% amylose | Sodium Chloride | Clay (Attapulgite) | Alkali | Ureaformaldehyde condensate | Water (Raw starch portion) | Raw Corn Starch | Viscosity (seconds) | Holdout (seconds) |
|---|---|---|---|---|---|---|---|---|---|---|---|---|
| 1 | 230 | 15 | 15 |  | 5 | 2.1 | 4.5 | 10.5 | 270 | 160 | 35 | 19.6 |
| 2 | 230 |  | 30 |  | 5 | 2.1 | 4.5 | 10.5 | 270 | 160 | 22.4 | 10.3 |
| 3 | 230 | 21 |  | 9 | 5 | 2.1 | 4.5 | 10.5 | 270 | 160 | 34.5 | 21.6 |
| 4 | 230 |  |  | 30 | 5 | 2.1 | 4.5 | 10.5 | 270 | 160 | 27.3 | 24.6 |

It will, therefore, be apparent from a study of the above table that the percentage of amylose, as based upon the weight of total solids, of any particular formulation may be readily determined by simply adding up the total parts by weight of the solid components present in the selected formulation and thereupon dividing the figure thus obtained into the total weight of amylose which is present in this formulation and then, finally, multiplying the latter result by 100. Thus, for example, when this series of calculations are conducted with respect to the contents of Formulation #1 in the above table, the result arrived at will be a figure of 14.1% for the percentage of amylose as based upon the weight of total solids present therein.

Example VI

This example illustrates the use of non-polymeric aqueous urea-formaldehyde concentrates as the stabilizer systems for the amylose solutions used in formulating the corrugating adhesives of our invention.

TABLE V

| Formulation Number | Water (Carrier) | Amylose | Sodium Chloride | Clay (Attapulgite) | Alkali | Urea | Urea-formaldehyde condensate | Water (Raw starch portion) | Raw Corn Starch | Viscosity (seconds) | Holdout (seconds) |
|---|---|---|---|---|---|---|---|---|---|---|---|
| 1 | 230 | 30 | 5 | 2.1 | 5.0 |  | 10.5 | 270 | 160 | 23.8 | 12.8 |
| 2 | 230 | 30 | 5 | 2.1 | 5.0 | 5.3 | 10.5 | 270 | 160 | 38.3 | 11.7 |
| 3 | 230 | 30 | 5 | 2.1 | 5.0 | 10.6 | 21 | 270 | 160 | 24.8 | 19.9 |

Example VII

This example illustrates certain advantageous features, namely, prolonged pot life at uniform viscosity under highly alkaline conditions, which can be realized by using the adhesive compositions of this invention.

In order to illustrate the particularly favorable results obtained by the use of our adhesive formulations, an adhesive composition exemplary of those compositions heretofore utilized in the corrugating industry was prepared for purposes of comparison with our adhesives. Accordingly, a composition comprising 100 parts of pregelatinized corn starch, 500 parts of pearl corn starch and 45 parts of resorcinol was slurried with 2045 parts of water containing 9 parts of sodium hydroxide, at a temperature of from 100° to 115° F., the usual application temperature on conventional equipment used in the corrugated board industry. To this slurry were then added 25 parts of paraformaldehyde and the composition was mixed for 1 hour while maintaining the above described temperature range. Pot life was evaluated by determining the viscosity of the paste and this was compared with the pot life of the adhesive composition of Example I after similar intervals of standing. The following results were obtained:

| Viscosity | Composition exemplary of those heretofore used | Composition of Example I |
|---|---|---|
| Initial | 29 sec | 30 sec. |
| After 2.5 hours | 80 sec | 31 sec. |
| After 4 hours | 144 sec | 32 sec. |
| After 24 hours | Gelled | 35 sec. |
| After 1 week |  | Still fluid. |

After standing for 1 week, the potential waterproof adhesive composition of Example I was used in the preparation of a waterproof bond which was tested as described earlier with the results being generally similar to those obtained in Example I.

It will be noted that after 2.5 hours, the adhesive composition containing a resorcinol-formaldehyde resin had a viscosity of about 80 seconds. The viscosity then increased rapidly to 144 seconds after another 1.5 hours. This adhesive composition exhibited poor glue line and machining properties. On the other hand, our adhesive compositions exhibited excellent viscosity stability.

Any departure from the above description which conforms to the present invention is intended to be included within the scope of the invention as defined by the following claims.

We claim:
1. An adhesive composition comprising a carrier portion for ungelatinized starch and a quantity of from 300–700 parts of ungelatinized starch solids suspended in said carrier portion, said carrier portion comprising an aqueous solution of dispersed amylose and from 10–100 parts of (a) a member selected from the group consisting of paraformaldehyde, aqueous solutions of methanol stabilized formaldehyde, and aqueous alkaline solutions of formaldehyde, and from 5–100 parts of (b) a member selected from the group consisting of urea, monomethylol urea, succinamide and adipamide; the latter proportions being based on the weight of solids per 100 parts by weight of dispersed amylose in said adhesive composition, there being at least about 14.0% of amylose, as based on the total weight of solids, present in said composition.

2. An adhesive composition comprising a carrier portion for ungelatinized starch and a quantity of ungelatinized starch solids suspended in said carrier portion, said carrier portion comprising an aqueous alkaline solution of dispersed amylose, paraformaldehyde, and urea; wherein in said composition paraformaldehyde is present in a concentration ranging from 10 to 100 parts, by weight, per 100 parts of dispersed amylose; and, the urea is present in a concentration ranging from 5 to 100 parts, by weight, per 100 parts, by weight, of dispersed amylose; there being at least about 14.0% of amylose, as based on the total weight of solids, present in the composition.

3. The composition of claim 2 wherein the amylose is derived from the separation of the amylose and amylopectin components of whole starch.

4. The composition of claim 2 wherein the amylose is derived from whole starch containing at least 55% amylose.

5. The method of preparing an adhesive composition for use in making corrugated paperboard which comprises mixing an aqueous alkaline amylose dispersion with from 10–100 parts of (a) a member selected from the group consisting of paraformaldehyde, alkaline aqueous solutions of methanol stabilized formaldehyde, and aqueous solutions of formaldehyde, and non-polymeric aqueous urea-formaldehyde concentrates, and from 5–100 parts of (b) a member selected from the group consisting of urea, monomethylol urea, succinamide and adipamide, thereby forming a stabilized aqueous amylose carrier portion, and mixing a quantity of from 300–700 parts of ungelatinized starch solids with said carrier portion, thereby producing a suspension of the ungelatinized starch solids in said carrier portion; the latter proportions being based on the weight of solids per 100 parts by weight of dispersed amylose in said adhesive composition, there being at least about 14.0% of amylose, as based on the total weight of solids, present in said composition.

6. The method of preparing an adhesive composition for use in making corrugated paperboard which comprises mixing an aqueous alkaline amylose dispersion with paraformaldehyde and urea, thereby forming a stabilized aqueous amylose carrier portion, and mixing a quantity of ungelatinized starch solids with said carrier portion, thereby producing a suspension of the ungelatinized starch solids in said carrier portion; wherein in said composition paraformaldehyde is present in a concentration ranging from 10 to 100 parts, by weight per 100 parts of dispersed amylose; and, the urea is present in a concentration ranging from 5 to 100 parts, by weight, per 100 parts, by weight, of dispersed amylose; there being at least about 14.0% of amylose, as based on the total weight of solids, present in the composition.

7. A method of preparing an adhesive composition capable of forming a waterproof bond in situ which comprises preparing an aqueous alkaline mixture of dispersed amylose, paraformaldehyde, and urea, said mixture serving as the carrier portion for ungelatinized starch solids which are suspended in said carrier portion; wherein in said composition paraformaldehyde is present in a concentration ranging from 10 to 100 parts, by weight, per 100 parts of dispersed amylose; and, the urea is present in a concentration ranging from 5 to 100 parts, by weight, per 100 parts, by weight, of dispersed amylose; there being at least about 14.0% of amylose, as based on the total weight of solids, present in the composition.

References Cited by the Examiner

UNITED STATES PATENTS

| | | | |
|---|---|---|---|
| 2,801,184 | 7/1957 | Miyamoto | 260—233.3 |
| 2,973,243 | 2/1961 | Kudera | 106—213 |
| 2,999,030 | 9/1961 | Roederer et al. | 106—213 |
| 2,999,032 | 9/1961 | Dekker | 106—213 |
| 3,019,120 | 1/1962 | Bauer et al. | 106—213 |
| 3,024,212 | 3/1962 | Paschall et al. | 260—17.3 |

FOREIGN PATENTS

| | | |
|---|---|---|
| 632,789 | 12/1949 | Great Britain. |
| 772,479 | 4/1957 | Great Britain. |

WILLIAM H. SHORT, *Primary Examiner.*

JAMES A. SEIDLECK, R. W. GRIFFIN, E. M. WOODBERRY, *Assistant Examiners.*